(12) United States Patent
Mansour et al.

(10) Patent No.: US 11,677,729 B2
(45) Date of Patent: *Jun. 13, 2023

(54) SECURE MULTI-PARTY PROTOCOL

(71) Applicant: Visa International Service Association, San Francisco, CA (US)

(72) Inventors: Rasta A. Mansour, Cupertino, CA (US); Simon Law, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/307,214

(22) Filed: May 4, 2021

(65) Prior Publication Data

US 2021/0258288 A1 Aug. 19, 2021

Related U.S. Application Data

(63) Continuation of application No. 16/457,639, filed on Jun. 28, 2019, now Pat. No. 11,038,853, which is a
(Continued)

(51) Int. Cl.
*H04L 9/40* (2022.01)
*H04L 9/08* (2006.01)

(52) U.S. Cl.
CPC .......... *H04L 63/045* (2013.01); *H04L 9/0822* (2013.01); *H04L 9/0825* (2013.01); *H04L 63/061* (2013.01)

(58) Field of Classification Search
CPC ... H04L 63/045; H04L 9/0822; H04L 63/061; H04L 9/0825
See application file for complete search history.

(56) References Cited

U.S. PATENT DOCUMENTS 8,925,043 B2 * 12/2014 Hildebrand ............. G06F 21/41
726/4
9,432,189 B1 * 8/2016 Wu ........................ H04L 9/0819
(Continued)

OTHER PUBLICATIONS

U.S. Appl. No. 15/361,180, "Final Office Action", dated Nov. 8, 2018, 8 pages.
(Continued)

*Primary Examiner* — Mohammed Waliullah
(74) *Attorney, Agent, or Firm* — Kilpatrick Townsend & Stockton LLP

(57) ABSTRACT

A requestor and a responder may conduct secure communication by making API calls based on a secure multi-party protocol. The requestor may send a request data packet sent in a API request to the responder, where the request data packet can include at least a control block that is asymmetrically encrypted and a data block that is symmetrically encrypted. The responder may return a response data packet to the requestor, where the response data packet can include at least a control block and a data block that are both symmetrically encrypted. The requestor and the responder may derive the keys for decrypting the encrypted portions of the request and response data packets based on some information only known to the requestor and the responder. The secure multi-party protocol forgoes the need to store and manage keys in a hardware security module.

20 Claims, 6 Drawing Sheets

Related U.S. Application Data continuation of application No. 15/361,180, filed on Nov. 25, 2016, now Pat. No. 10,382,409.

(60) Provisional application No. 62/260,160, filed on Nov. 25, 2015.

(56) References Cited

U.S. PATENT DOCUMENTS

| | | | |
|---|---|---|---|
| 10,382,409 B2 | 8/2019 | Mansour et al. | |
| 2015/0326547 A1* | 11/2015 | Carlson | H04L 63/061 713/171 |
| 2017/0149740 A1 | 5/2017 | Mansour et al. | |

OTHER PUBLICATIONS

U.S. Appl. No. 15/361,180 , "Non Final Office Action", dated Jun. 5, 2018, 13 pages.
U.S. Appl. No. 15/361,180 , "Notice of Allowance", dated Mar. 27, 2019, 10 pages.
U.S. Appl. No. 16/457,639 , "Non-Final Office Action", dated Oct. 29, 2020, 9 pages.
U.S. Appl. No. 16/457,639 , "Notice of Allowance", dated Feb. 4, 2021, 8 pages.

* cited by examiner

SECURE MULTI-PARTY PROTOCOL

CROSS-REFERENCES TO RELATED APPLICATIONS

The present application is a continuation of U.S. patent application Ser. No. 16/457,639, filed on Jun. 28, 2019, which is a continuation application of U.S. patent application Ser. No. 15/361,180 filed on Nov. 25, 2016, now U.S. patent Ser. No. 10/382,409, which is a non-provisional of and claims the benefit of priority to U.S. Provisional Application No. 62/260,160, filed Nov. 25, 2015, the disclosures of which are hereby incorporated by reference in their entirety.

BACKGROUND

Data is often protected when communicated between a sender entity and a recipient entity. This is because there are typically one or more intermediary entities operated by third parties that reside between the two entities. Since the intermediary entities handle the data before it is received by a recipient entity, it is not secure for a sender entity to send unprotected confidential data. For example, there is a risk that a malicious party may intercept the confidential data and utilize it for fraud. Thus, in situations such as the one described above, a sender entity typically encrypts, obfuscates, or otherwise protects confidential data before providing it to a recipient entity.

An exemplary system 50 is shown in FIG. 1. Confidential data may be communicated from a sender entity computer 10 associated with a sender entity to a recipient entity computer 40 associated with a recipient entity. The confidential data may be processed by multiple intermediary servers, intermediary server 20 and intermediary server 30, associated with intermediary entities (e.g., third parties) before eventually being received by recipient entity computer 40.

In order to protect the confidential data when being communicated from sender entity computer 10 to recipient entity computer 40, sender entity computer 10 may first encrypt the confidential data before providing it to recipient entity computer 40. Intermediary server 20 may receive the encrypted data and then communicate the encrypted data to intermediary server 30. Recipient entity computer 40 can then receive the encrypted data sent by sender entity computer 10 and decrypt the encrypted data for use.

While the exemplary process described above with respect to FIG. 1 can be utilized to protect confidential data during transmission, it presents a number of problems. For example, the sender entity and recipient entity may have to store corresponding encryption keys to be utilized for encrypting and decrypting the confidential data. Typically, hardware security modules (HSMs) are implemented in order to securely store such encryption keys. However, since HSMs are expensive and cumbersome to manage, the use of HSMs may not be a viable option in many cases.

In addition, key management can also present a problem. In some cases, the sender entity and the recipient entity may have to follow a protocol to update keys regularly for security purposes. However, a key rotation process can be cumbersome because it involves coordination between the sender entity and the recipient entity each time that keys are updated. For example, the sender entity may have to manage regeneration, storage, and delivery of multiple encryption key sets and communicate updated information to the recipient entity so that encrypted data can be processed appropriately.

As described above, data typically needs to be protected when being sent to a remote entity. While existing data security protocols exist, they are not practical when applied to situations that might involve multiple intermediary parties that handle data processing.

Embodiments of the invention address these and other problems, individually and collectively.

BRIEF SUMMARY

Embodiments of the invention are directed to secure multi-party protocols. While protecting data transmitted between multiple entities typically involves the utilization of hardware security modules (HSMs), these are expensive and cumbersome to program. Thus, a HSM-based solution is typically not viable for various requestors (e.g., authorization entities) calling an API for secure data transmission. Embodiments of the invention can allow such entities to transmit data securely without the requirement that they operate a HSM.

One embodiment of the invention is directed to a method for securing communications between a first computer and a second computer. In some cases, the first computer may be an authorization entity computer and the second computer may be a token service computer. The method may comprise receiving, by the second computer from the first computer over a communications network, a request data packet. The request data packet can include a control block comprising a symmetric key and a data block encrypted with the symmetric key. In some cases, the symmetric key may be an ephemeral key. The control block may be encrypted with a public key of a public-private key pair. The method may further comprise decrypting, by the second computer, the control block with a private key of the public-private key pair. The method can further comprise extracting, by the second computer, the symmetric key from the control block. The method may further comprise decrypting, by the second computer, the encrypted data block with the extracted symmetric key.

In some embodiments, the method may comprise further steps wherein the data block may be a first data block, the control block may be a first control block, and the symmetric key may be a first symmetric key. The method may further comprise generating by the second computer, a second symmetric key using a predetermined algorithm based on data in the first control block. In some implementations, the data in the first control block utilized to generate the second symmetric key may include the first symmetric key. In some cases, the first symmetric key may be generated using a shared secret and a variable datum previously supposed by the second computer. In some cases, the variable datum may be a salt.

The method may further comprise generating, by the second computer, a response data packet comprising a second data block and a second control block comprising the first symmetric key. The method may further comprise transmitting, by the second computer, the response data packet to the first computer over the communications network. In some cases, the method may further comprise encrypting, by the second computer, the second data block using the first symmetric key. In some cases, the method may further comprise encrypting, by the second computer, the second control block using the second symmetric key.

In some embodiments, the request data packet may further comprise a first leader block and a first signature block, and the response data packet may further comprise a second leader block and a second signature block. In some cases, the first leader block can include information indicating an encryption algorithm utilized to obtain the key for decrypting the first control block. Further, the second leader block can include information indicating an encryption algorithm utilized to obtain the key for decrypting the second control block.

Embodiments of the invention are also directed to a computer comprising a processor and a computer readable medium coupled to the processor. The computer readable medium may comprise code executable to perform any method described herein, including a method for securing communications between a first computer and a second computer.

DETAILED DESCRIPTION

Figure 1:
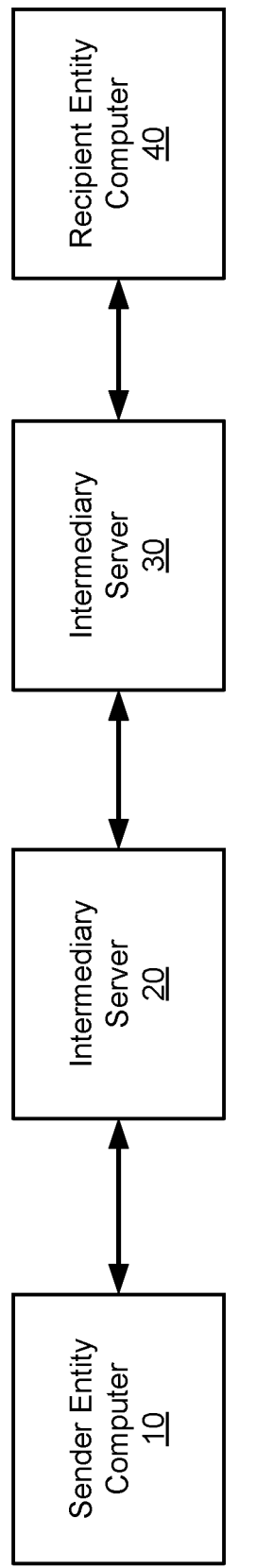
FIG. 1 shows a diagram illustrating a conventional system.

Conventional systems typically involve communication of data over multiple hops when data is transmitted from a sender entity to a recipient entity. Some conventional systems may protect data with encryption and the use of hardware security modules (HSMs) to store encryption keys. However, such systems are problematic for a number of reasons. For example, HSMs are expensive and cumbersome to program and are not a viable option for many sender entities (e.g., authorization entities). Additionally, the key management mechanisms implemented by conventional systems are also cumbersome because the sender entity and recipient entity have to coordinate so that encryption keys are regenerated, stored, and delivered appropriately when keys are rotated. Embodiments of the invention solve these problems and enable a secure multi-party protocol (SMPP) that does not rely on the key delivery, key rotation, and HSM requirements as in conventional systems.

Before discussing specific embodiments of the invention, some descriptions of some terms may be useful.

A "request data packet" may be a collection of data sent with a request. In some embodiments, the request data packet may sent as the body of a call to an Application Program Interface (API). The request data packet may be in a certain format. In some implementations, the request data packet may comprise a leader block, a control block, a data block, and a signature block. In some cases, the control block may be asymmetrically encrypted and the data block may be symmetrically encrypted. Each block may comprise information, some or all of which may be utilized to process the API call. In some cases, the leader block may include an entity name, a zone, and a control block encryption type. The control block may include an entity device ID, a device ID, a sequence number, a timestamp, a symmetric key, a data block encryption flag, a nonce, a symmetric algorithm type, a HMAC hash algorithm, and key value assertions. The data block may comprise payload data (e.g., JavaScript Object Notation (JSON) data). The signature block may comprise a hash-based message authentication code (HMAC) based on the leader, control, and data blocks.

A "response data packet" may be a collection of data sent with a response. In some embodiments, the response data packet may be sent as the body of a call to an Application Program Interface (API). The response data packet may be in a certain format. In some implementations, the response data packet may comprise a leader block, a control block, a data block, and a signature block. In some cases, the control block may be symmetric encrypted and the data block may also be symmetric encrypted. Each block may comprise information, some or all of which may be utilized to process the API call. In some cases, the leader block may include an entity name, a zone, and a control block encryption type. The control block may include an entity device ID, a device ID, a sequence number, a timestamp, a symmetric key, a data block encryption flag, a nonce, a symmetric algorithm type, a HMAC hash algorithm, and key value assertions. The data block may comprise payload data (e.g., JavaScript Object Notation (JSON) data). The signature block may comprise a hash-based message authentication code (HMAC) based on the leader, control, and data blocks.

A "shared secret" may be any data known only to entities involved in secure communication. The data may be in any suitable format and may comprise any combination of data types (e.g., alphanumeric characters, special symbols, etc.). In some cases, the shared secret may be a password, a phrase, a PIN, key information, or a random value.

A "variable datum" may be any piece of information that varies. In some embodiments, the variable datum is randomly generated. In some embodiments, the variable datum may be a random value that is utilized as an input for generation of another value. For example, the variable datum may be a salt that is utilized as an additional input into a one-way hash function. In other cases, the variable datum may be a seed or a nonce.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived.

A "server computer" can be a powerful computer or a cluster of computers. For example, the server computer can be a large mainframe, a minicomputer cluster, or a group of servers functioning as a unit. In one example, the server computer may be a database server coupled to a Web server.

Embodiments of the invention enable the Secure Multi-Party Protocol (SMPP). The SMPP may include an API/Application Layer that can handle the application, mobile device, user assertions, tokens, and other data. The SMPP may also include a SMPP Layer that enables end-to-end data confidentiality, integrity, and replay attack detection, etc. The SMPP may further include a SSL/TLS Layer that enables channel level data security.

The SMPP functionally may sit in between the API/application layer and the SSL/TLS layer. Hence, it does not depend on transport channel security (e.g., SSL/TLS addresses), nor is it involved with application and business logic semantics of data, or token and assertions utilized to establish identity and trust between the two end-points of an API invocation. In some embodiments, the SMPP layer can include a data encoding layer that sits in between the API/Application Layer and the SSL/TLS Layer. The data encoding layer may encode and decode data in a cryptographically secure manner such that each API implementation does not have to solve the same data encoding problem independently, and perhaps inconsistently of other API implementations.

Additionally, the confidentiality and data integrity support at the SMPP layer allows the communications from a mobile application to a token service system to pass through any interim hop, such as a wallet provider network, without compromising any data while in-transit through the interim network. In some embodiments, verification and acceptance of trust at the SMPP layer can be overwritten by the API/application layer semantics. For instance, if there is an application level token or user password validation protocol, and the received information does not match what the token service backend expects, then the API request can fail.

The SMPP may be utilized in a multi-party scenario. A multi-party scenario may be one that comprises one or more hops in between the two end-points of an API (i.e., the requestor and the responder points), and one or more sources of trust. The SMPP also enables end-to-end data confidentiality (e.g., encryption), data integrity (e.g., HMAC signature), as well as transitive trust. In some embodiments, the requestor of the API may be an authorization entity (e.g., issuer) and the responder of the API may be a token service system (e.g., processor server computer providing token services). The token service system may also be referred to as a token service computer.

Transitive trust can work as follows in a multi-party scenario composed of a token service system, the authorization entity backend server, the mobile native authorization entity application, and an intermediary service provider in between the mobile native authorization entity app and the token service system. The token service system can have trust with the authorization entity backend via an authorization entity backend on-boarding process with the token service system. The authorization entity backend can have trust with the mobile native authorization entity application via a mobile application on-boarding process with the authorization entity backend. The authorization entity backend may generate a device specific assertion for the mobile application to include in its API invocation to the token service system. The token service system can then verify this assertion and if the assertion is valid, it can then implicitly trust the mobile authorization entity application as well.

The SMPP provides several advantages compared to conventional systems. In many point-to-point, or multi-party API-based communications between networked devices, there are recurring patterns to encrypt some data, validate the integrity of data received, check to see if the requests or responses are still valid (e.g., not expired), and check to see that the requests are coming from a known source (e.g., client). Typical API interface designs may be able to implement the above set of patterns independently, yet in a manner inconsistent with other APIs. Instead, embodiments of the invention enable a common protocol layer can be designed to address these features in a consistent, reusable, and flexible manner.

The SMPP enables a consistent, reusable, and flexible protocol layer that can be designed to universally address all requirements for confidentiality, integrity, replay attack detection, expired credentials detection, and known-source validation for all APIs. Moreover, the SMPP can be applied to both requests and responses (e.g., be bi-directional), API invocation, and push provisioning API invocation. Additionally, the methods of data encryption utilized are not limited, and can be asymmetric (e.g., PKI based) or symmetric (e.g., shared secret).

Embodiments of the invention may involve a token service API that includes confidential data in the request or response payload sent between entities. In some cases, the token service API may support the following features:

Confidentiality: End-to-end strong encryption and hash-crypto functions of confidential data irrespective of channel security (e.g., SSL/TLS).

Integrity: Digital signature of payload data end-to-end.

Bi-directional support for confidentiality and integrity: Both request and response payload can support confidentiality and integrity requirements.

Authentication: The token service computer can validate a requestor assertion credential to authenticate the request as coming from a known authorization entity Web application or mobile application.

Replay attack detection: The token service computer can have a built-in mechanism in the protocol to recognize a previously processed API Request.

Expired request/response detection: The token service computer can have a built-in mechanism to recognize an expired API request, based on a timestamp or credentials. For example, the token service computer can determine expiration or revocation of utilized PKI credentials.

Ease of authorization entity integration: There is no requirement for the authorization entity to have an HSM to store any shared secret. In fact, no shared secret is needed on the authorization entity side.

Secure: The API protocol scheme is secure. That is, the only possible attack vector would be brute force, breaking through multiple layers of security.

Computationally efficient encoding/decoding of request/response data: Very few encryption and hash operations are performed per each request/response.

Standards driven: Support for standards based strong encryption and hash algorithms (e.g., AES-256, 3DES, SHA-2-256), as well as, different types of public/private key certs (e.g., RSA-1024, RSA-2048, ECC-256, etc.).

Support the same protocol scheme irrespective of scenario at issue: The proposed protocol scheme can be utilized for different scenarios including for authorization entity mobile applications and authorization entity web applications.

The proposed protocol scheme can include:

No confidential key information (e.g., shared secret) storage requirement by the authorization entity. Only a tokenization service issued public key and a random seed may be stored by the authorization entity.

The client-side API invocation may utilize the sequence number in the Request/Response packet as the correlation ID for matching a response with its associated decryption key when the request is being processed by the token service computer. Other data may be either derived as needed, or stored encrypted in-memory.

Minimal state retention on the server side (e.g., token service computer) for replay attack detection.

Leveraging of HSM environment on the token service computer for encryption/decryption key management and PKI key generation.

Support for out-of-band exchange of tokenization service issued data (e.g., public key, seed, zone, and Entity ID) in an authorization entity registration enrollment flow.

Support for distinct tokenization service issued public/private key pair, per authorization entity, per authorization entity operational zone (i.e., one key-pair for each operational zone). The public key may be provided to the authorization entity and stored in the token service computer environment.

The proposed protocol is not limited to use in the specific scenarios discussed in this application. The protocol utilizes algorithms that are cryptographically secure and that are not in security through obscurity, and that can be readily reused in other use cases and in other token service API flows. The protocol can be reused multiple times.

Further, while scenarios directed to an authorization entity and a processor server computer are described in detail below, embodiments are not so limited. For example, the SMPP may be implemented with any other system in which there exists a requestor and a responder to an API, where one or more intermediary entities may exist between the requestor and the responder. The SMPP enables end-to-end secure communication of data between the requestor and the responder.

Embodiments of the invention can be described with respect to at least two scenarios. A first scenario according to some embodiments of the invention is described with respect to FIG. 2. In this scenario, there may be no native authorization entity mobile application on a mobile device. Instead, the service provider application can launch a browser session to run a web hosted authorization entity web application.

Figure 2:
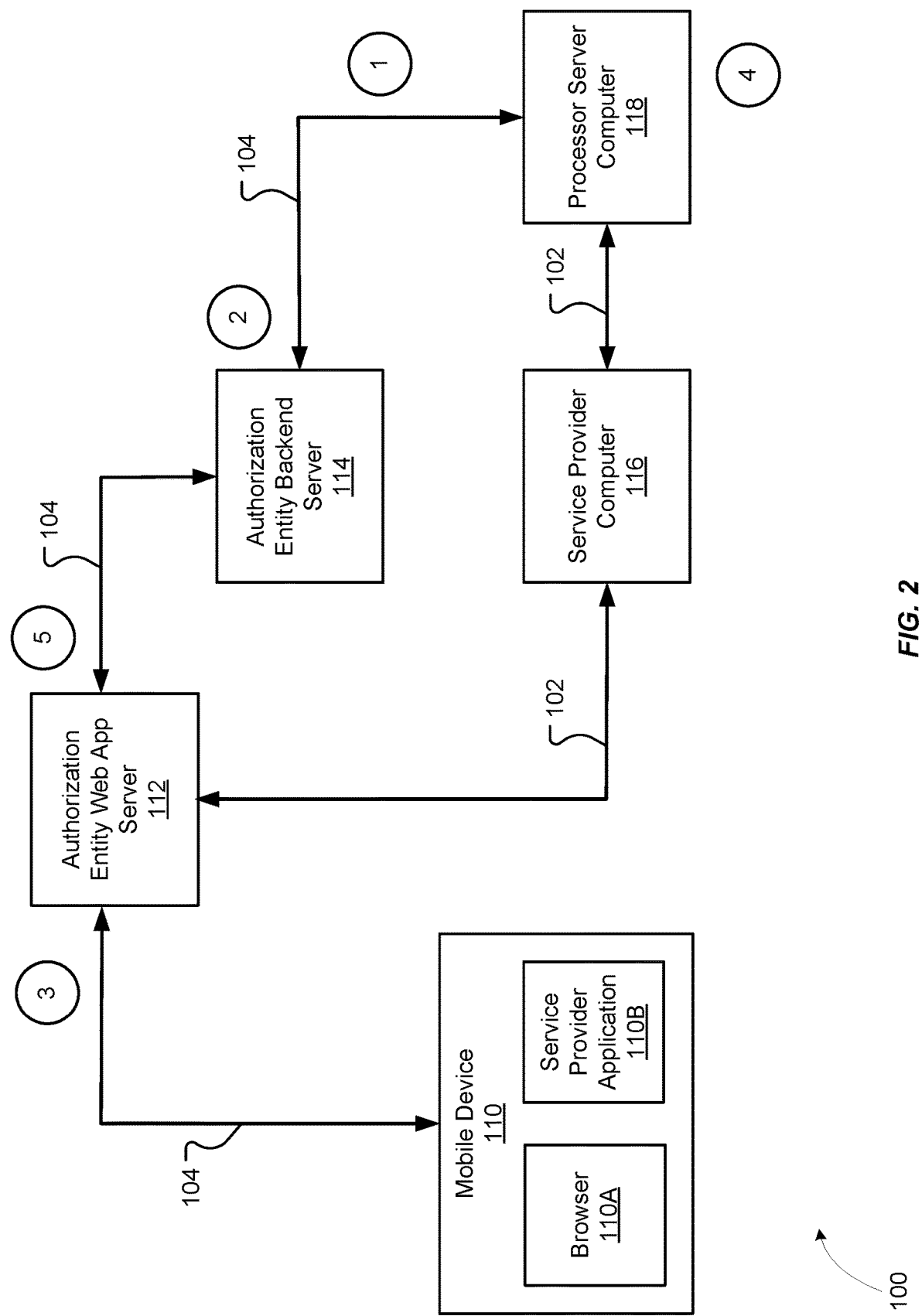
FIG. 2 shows a diagram illustrating API calls communicated between a service provider computer and an authorization entity web application server according to some embodiments of the invention.

FIG. 2 shows a system 100 illustrating API calls communicated between a service provider computer and an authorization entity web application server according to some embodiments of the invention. FIG. 2 includes a mobile device 110 that runs a browser 110A associated with a service provider application 110B hosted by an authorization entity web application server 112 in communication with an authorization entity backend server 114 and a service provider computer 116. The authorization entity backend server 114 and service provider computer 116 may be in communication with a processor server computer 118. The processor server computer 118 may provide tokenization services and may also be known as a token service computer or token service provider computer.

Mobile device 110 may be a computing device operated by a user and that is capable of communicating information with other devices (e.g., authorization entity web application server 112). Mobile device 110 can include a processor, a memory, input devices, and output devices, operatively coupled to the processor. Some non-limiting examples of mobile device 110 may include cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, and the like.

Mobile device 110 may be capable of running browser 110A and service provider application 110B. Browser 110A may be any browser supported by mobile device 110 and that can communicate information between service provider application 110B and authorization entity web application server 112. Service provider application 110B may launch the browser 110A. Service provider application 110B may be any application that can run on mobile device 110 that provides certain services to the user of mobile device 110. In an exemplary case, service provider application 110B may be a wallet application that provides wallet services to the user of mobile device 110.

Authorization entity web application server 112 may be a computing device that is associated with an authorization entity. Authorization entity web application server 112 may host authorization entity web application server 112. Authorization entity web application server 112 can be capable of receiving, analyzing, and routing information between mobile device (e.g., from browser 110A and service provider application 1106) and authorization entity backend server 114 and service provider computer 116. Authorization entity web application server 112 may be part of an authorization entity network.

Authorization entity backend server 114 may be a computing device that is operated by an authorization entity. Authorization entity backend server 114 may be involved in authorization of a transaction. The authorization entity backend server 114 may determine whether a transaction can be authorized and may generate an authorization response message including an authorization status (also may be known as an authorization decision). In some embodiments, an authorization entity backend server 114 may be a payment account issuer computer. In some cases, the authorization entity backend server 114 may store contact information of one or more users. In other embodiments, the authorization entity backend server 114 may authorize non-financial transactions involving a user. For example, the authorization entity backend server 114 may make an authorization decision regarding whether the user can access a certain resource. Authorization entity backend server 114 may be part of an authorization entity network.

Service provider computer 116 may be a computing device that can provide certain services. Service provider computer 116 may host service provider application 1106 and provide services to the user of mobile device through service provider application 1106. In an exemplary case, service provider computer 116 may be a wallet provider computer that provides wallet services.

Processor server computer 118 may include data processing subsystems, networks, and operations used to support and deliver authorization services, exception file services, and clearing and settlement services. For example, processor server computer 118 may comprise a server coupled to a network interface (e.g., by an external communication interface), and databases of information. In some cases, processor server computer 118 may be a transaction processing network (e.g., payment processing network). An exemplary processing network may include VisaNet™ Processing networks such as VisaNet™ are able to process credit card transactions, debit card transactions, and other types of commercial transactions. VisaNet™, in particular, includes a VIP system (Visa Integrated Payments system) which processes authorization requests and a Base||system which performs clearing and settlement services. Processor server computer 118 may use any suitable wired or wireless network, including the Internet. In some embodiments, processor server computer 118 may be in communication with one or more databases (e.g., token database). In some embodiments, processor server computer 118 may provide tokenization services, including a token service API.

In the scenario shown in FIG. 2, the token service API hosted by processor server computer 118 may require confidential data in the request or response payload, and may get called from a web application associated with authorization entity web application server 112. The authorization entity web application server 112 may send API data intended for processor server computer 118 through multiple hops (e.g., from authorization entity web application server 112 to service provider computer 116, and then from service provider computer 116 to processor server computer 118). Any such data may be end-to-end encrypted and/or signed irrespective of whether the API call is conducted over a secure communication channel (e.g., over a SSL/TLS channel). Therefore, the communications passing through the path 102 between the authorization entity web application server 112 and service provider computer 116, as well as between the service provider computer 116 and processor server computer 118 may be encrypted and/or signed.

The path 104 between mobile device 110 and authorization entity web application server 112, between authorization entity web application server 112 and authorization entity backend server 114, as well as between authorization entity backend server 114 and processor server computer 118 may be an out-of-band path that does not have to be end-to-end encrypted. The path 104 may be for initial enrollment of the authorization entity with the token service provided by processor server computer 118, or for backend communication for the authorization entity web application server 112 and authorization entity backend server 114.

An exemplary method is described in detail with respect to steps 1 through 5 indicated in FIG. 2. The method shows an exemplary set up process that can be performed in order to enable the secure communications provided by SMPP when there is no native mobile application hosted by the authorization entity on mobile device 110. Instead, service provider application 110B can launch a browser session to run a web hosted authorization entity web application.

In some implementations, several of the steps may be performed in a different order as described or in parallel. Additionally, the computations described in the steps for deriving certain values (e.g., hash values of concatenation of multiple fields) are not limiting. For example, the fields can be concatenated in a different order as that described herein, and other fields can also be utilized in place of those described as well. Further, the names of certain fields utilized in the steps are only for exemplary purposes and thus can be changed to other suitable names.

It is understood that additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 1, during the out-of-band enrollment of the authorization entity with the token service (shown as path 104), the authorization entity backend server 114 may exchange an Entity Name, Entity ID(s), and Zone(s) with the processor server computer 118. One Entity ID may be assigned for each operating Zone. Entity ID(s) may be dynamically derived and thus are not stored by authorization entity backend server 114. For example, Entity ID(s) can be generated at run-time, as needed, from a combination of information in the authorization entity's possession (e.g., the signature block of a private key certificate used for secure communication to processor server computer 118). The private key associated with the authorization entity can be safely kept by the authorization entity to assure proper two-way secure TLS communication with processor server computer 118. Hence, integration of the authorization entity with the token service of processor server computer 118 in this sense is HSM-less, as it does not require storing any additional shared secret.

At step 2, in exchange, during the same out-of-band process, the authorization entity backend server 114 may receive from processor server computer 118 a unique public key for each Zone(s), plus a seed for generating the Entity token service ID. The Entity token service ID may be one of the values with which processor server computer 118 identifies a corresponding authorization entity. In some embodiments, the entity token service ID can be computed as Hash(Entity ID‖Seed). A public key associated with a Zone may be one that is issued by processor server computer 118 for an authorization entity application operating in a certain region associated with the Zone (e.g., North America Zone).

At step 3, during development of the authorization entity web application, the authorization entity web application server 112 may put the public key provided by processor server computer 118 corresponding to the given Zone associated with the authorization entity, plus its own public key, in a Web application configuration file. Since these public keys are public data, they can be safely stored in an app-server configuration file.

At step 4, an Entity Name, Entity token service ID for each Zone(s), and public/private key pairs for each Zone(s) associated with the authorization entity may be stored securely by processor server computer 118. The public/private key pairs may be generated by processor server computer 118. A combination of the Entity Name and Zone can be utilized as the index for storage. In some cases, the Entity token service ID may be stored by processor server computer 118 as Hash(Entity ID‖seed). The seed may be discarded and is not stored anywhere after this step.

At step 5, the Web application hosted by authorization entity web application server 112 may be initiated for the first time. Authorization entity web application server 112 may send its Device ID to the authorization entity backend server 114. In some cases, the Device ID may be computed as Hash(HostName‖IP-Address). The authorization entity backend server 114 may in return send back to authorization entity web application server 112 an Entity Device ID. In some cases, the Entity Device ID may be computed as Hash(Entity token service ID‖Device ID‖Zone), which is equivalent to Hash(Hash(Entity ID‖Seed)‖Device ID‖Zone). Authorization entity web application server 112 may store the received Entity Device ID in memory and not to an external storage. It is noted that the Entity Device ID is not a "key" or key material. It is merely a reference ID for processor server computer 118 to ascertain that the Web application has conducted a proper initial enrollment process with the authorization entity.

Figure 3:
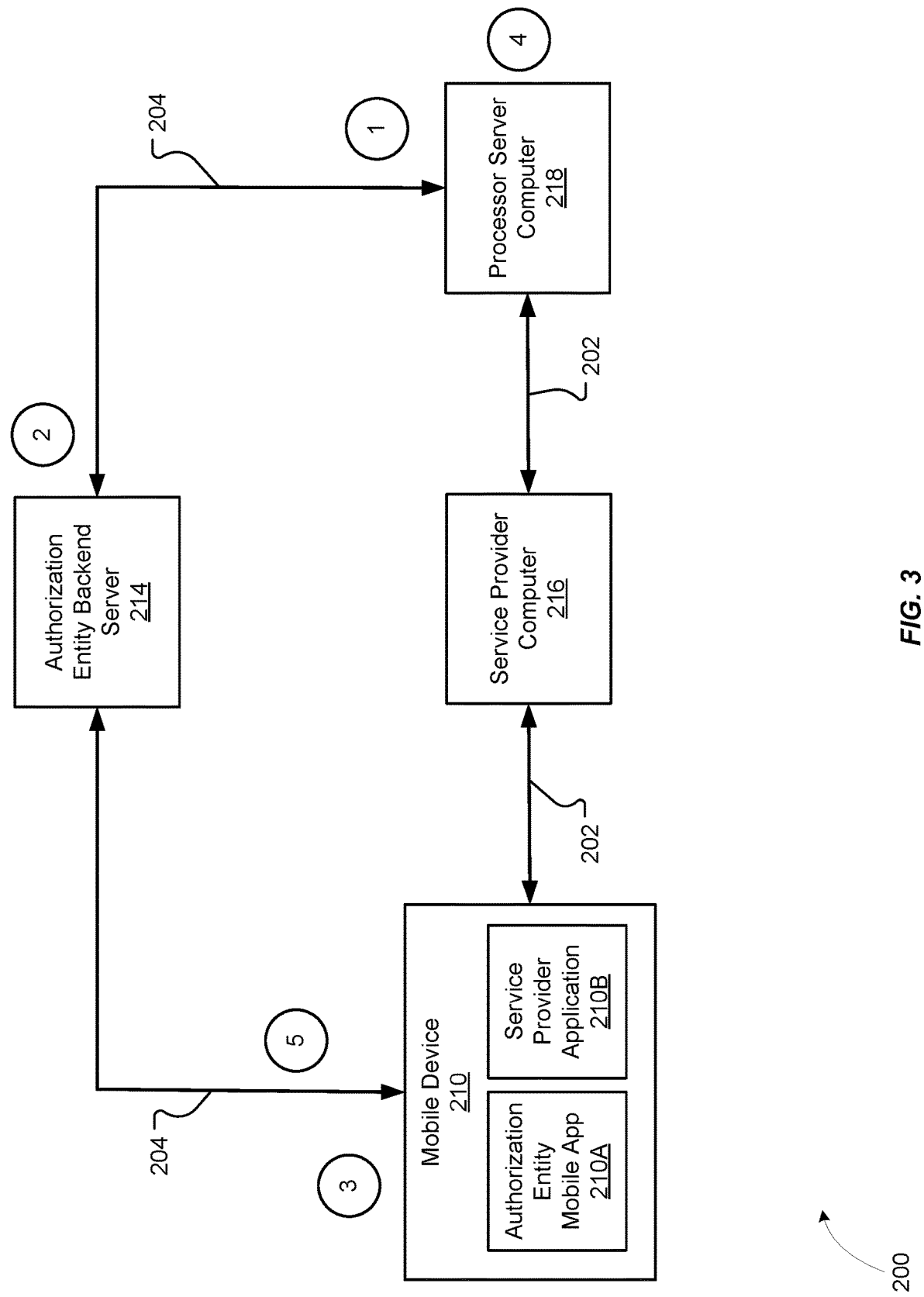
FIG. 3 shows a diagram illustrating API calls communicated between a service provider computer and an authorization entity mobile application according to some embodiments of the invention.

A second scenario according to some embodiments of the invention is described with respect to FIG. 3. In this scenario, there may be a native authorization entity mobile application running on a mobile device. A service provider application on the mobile device can launch the authorization entity mobile application, and all subsequent API calls can take place in the native authorization entity mobile application on the mobile device.

FIG. 3 shows a system 200 illustrating API calls communicated between a service provider computer and an authorization entity mobile application according to some embodiments of the invention. FIG. 3 includes a mobile device 210 that runs an authorization entity mobile application 210A associated with an authorization entity backend server 214. Mobile device 210 may also run a service provider application 210б hosted by a service provider computer 216. The authorization entity backend server 214 and service provider computer 216 may be in communication with a processor server computer 218. The processor server computer 218 may provide tokenization services and may also be known as a token service computer or token service provider computer. The processor server computer 218 may provide tokenization services and may also be known as a token service computer or token service provider computer.

Devices shown in FIG. 3 may have similar features to those in FIG. 2. For example, mobile device 210 may have similar features to those described for mobile device 110, service provider computer 216 may have similar features to those described for service provider computer 116, and processor server computer 218 may have similar features to those described for processor server computer 118. Authorization entity backend server 214 may have similar features to those described for authorization entity backend server 114, except that authorization entity backend server 214 may enable a mobile application, such as authorization entity mobile application 210A, to be run native on mobile device 210 instead of a web application running on a browser session.

Looking at FIG. 3, there are several objectives regarding how to encrypt data communicated between entities. One objective is to encrypt data in such a way that any intermediary system, such as service provider computer 216, is not able to read or alter this data. However, when the data arrives at processor server computer 218, processor server computer 218 will know how to decrypt it. Similarly, if any response data is sent back from processor server computer 218, another objective is to again encrypt that data in such a way that any system in between, such as service provider computer 216, cannot read or alter the data. However, when the encrypted data arrives at mobile device 210, the authorization entity mobile application 210A will know how to decrypt the response. Another objective is perform encryption and decryption processes in a secure way such that no entity capturing and recording communications between authorization entity mobile application 210A and processor server computer 218 is able to decipher the data encoded in it, irrespective of whether there is channel level security in place (e.g., SSL/TLS).

During the data exchange shown in FIG. 3 in the path marked by reference number 202, the authorization entity mobile application 210A may send confidential data through a service provider network via service provider computer 216 for eventual receipt by processor server computer 218. This data may not be exploitable while passing through service provider computer 216, or in general at any time in transit to processor server computer 218.

In the scenario shown in FIG. 3, the token service API hosted by processor server computer 218 may require confidential data in the request or response payload, and may get called from an mobile application associated with authorization entity backend server 214. The authorization entity backend server 214 may send the API data intended for processor server computer 218 through multiple hops (e.g., from the authorization entity mobile application 210A to service provider computer 216, and then from service provider computer 216 to processor server computer 218). Any such data may be end-to-end encrypted and/or signed irrespective of whether the API call is over a secure communication channel (e.g., over a SSL/TLS channel). Therefore, the path 202 formed by mobile device 210 to service provider computer 216, as well as between service provider computer 216 to processor server computer 218 may be encrypted and/or signed.

The path 204 between mobile device 210 to authorization entity backend server 214, as well as between authorization entity backend server 214 and processor server computer 218 may be an out-of-band path for initial enrollment of the authorization entity with the token service provided by processor server computer 218, or for backend communication for the authorization entity mobile application 210A to authorization entity backend server 214.

An exemplary method is described in detail with respect to steps 1 through 5 indicated in FIG. 3. The method shows an exemplary set up process that can be performed in order to enable the secure communications provided by SMPP when there is a native mobile application hosted by the authorization entity on mobile device 210.

In some implementations, several of the steps may be performed in a different order as described or in parallel. Additionally, the computations described in the steps for deriving certain values (e.g., hash values of concatenation of multiple fields) are not limiting. For example, the fields can be concatenated in a different order as that described herein, and other fields can also be utilized in place of those described as well. Further, the names of certain fields utilized in the steps are only for exemplary purposes and thus can be changed to other suitable names.

It is understood that additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 1, during the out-of-band authorization entity enrollment process (shown as path 204), the authorization entity backend server 214 exchanges an Entity Name, Entity ID(s), and Zone(s) with processor server computer 218. One Entity ID may be assigned for each Operating Zone. Entity ID(s) may be dynamically derived and thus are not stored by authorization entity backend server 214. For example, Entity ID(s) may be generated at run-time, as needed, from a combination of information in the authorization entity's possession (e.g., the signature block of a private key certificate used for secure communication to processor server computer 218). The private key associated with the authorization entity can be safely kept by the authorization entity to assure proper 2-way secure TLS communication with processor server computer 218. Hence, integration of the authorization entity with the token service of processor server computer 218 in this sense is HSM-less, as it does not require storing any additional shared secret.

At step 2, in exchange, during the same out-of-band process, the authorization entity backend server 214 receives from the processor server computer 218 a unique public key for each Zone plus a seed for each Entity ID for generating the Entity token service ID. The Entity token service ID may be one of the values with which processor server computer 218 identifies a corresponding authorization entity. A public key associated with a Zone may be one that is issued by processor server computer 218 for an authorization entity application operating in a certain region associated with the Zone (e.g., North America Zone).

The public keys and seeds can be stored in memory of authorization entity backend server 241 without protection because these are pieces of public data. In other words, even if an intermediary were to be able to obtain the public keys and seeds, the intercepted information would not be useful for conducting any decryption process. This is because the intermediary entities would be missing information at least regarding how to generate an appropriate decryption key. This is convenient as it forgoes the need for authorization entity backend server 241 to store sensitive data related to encryption, such as keys.

At step 3, during development of authorization entity mobile application, the authorization entity backend server 214 may put the public key provided by processor server computer 218 corresponding to the given Zone associated with the authorization entity, plus its own public key in the code of authorization entity mobile application 210A. For example, these public keys may be stored in the mobile application configuration file and may be protected by the mobile device OS security while at rest. Since these public keys are public data, they again do not need any special handling by authorization entity mobile application 210A.

At step 4, processor server computer 218 may securely store an Entity Name, Entity token service ID for each Zone(s), a seed for each Entity ID, and a public/private key pair for each combination of Entity ID and Zone(s) associated with the authorization entity. The data may be stored in any suitable secure storage area at processor server computer 218. In some embodiments, the secure storage area may be in a HSM environment hosted by processor server computer 218. The public/private key pairs may be generated by processor server computer 218. A combination of the Entity Name and Zone can be utilized as the index for storage. In some cases, the Entity token service ID may be stored by processor server computer 218 as Hash(Entity ID||Seed). In some embodiments, the seed may be discarded and may not be stored anywhere after this step.

At step 5, authorization entity mobile application 210A may be initiated for the first time. Authorization entity mobile application 210A may send its Device ID to authorization entity backend server 214. In some cases, the Device ID may be computed as Hash(Serial #||NEI). While one example of computing the Device ID is provided above, it is understood that other device parameters besides Serial # or IMEI may also be used, along with other user-specific or application-specific values.

The authorization entity backend server 214 may in return send back an Entity Device ID. In some cases, the Entity Device ID may be computed as Hash(Entity token service ID||Device ID||Zone), which is equivalent to Hash(Hash (Entity ID II Seed)||Device ID||Zone). The received Entity Device ID may then be stored securely by mobile device 210. The mobile device OS security may provide another layer of protection of the Entity Device ID while store stored at rest. Again, it is noted that the Entity Device ID is not a "key" or key material. It is merely a reference ID for processor server computer 118 to ascertain that the authorization entity mobile application 210A has conducted a proper initial enrollment process with the authorization entity.

In some embodiments, the exchange of data in step 5 can be further secured independent of SSL/TLS, if desired. Authorization entity backend server 214 may configure the authorization entity mobile application 210A with an authorization entity specific Public PKI key. Then, authorization entity mobile application 210A can randomly generate a nonce and asymmetrically encrypt the combination of the Device ID and the Nonce. Upon receipt of this data by authorization entity backend server 214, the authorization entity's private key can be utilized to decrypt this encrypted data. The addition of a nonce can increase security because the nonce is a randomly generated value that helps to obfuscate the Device ID and also cannot be predicted by an intermediary entity.

Further, before sending the Entity Device ID from authorization entity backend server 214 to the authorization entity mobile application 210A, the Entity Device ID can be XOR'ed with the nonce. Upon receipt of this data, authorization entity mobile application 210A can XOR the nonce to the data received from authorization entity backend server 214 to retrieve the Entity Device ID. This increases security because this adds at least one additional computation step that is only known by authorization entity backend server 214 and authorization entity mobile application 210A for obtaining Entity Device ID. While this one example describes use of XOR computations, embodiments are not so limited. Any other computations may be utilized that can be performed by authorization entity backend server 214 and authorization entity mobile application 210A to add additional security.

Embodiments of the invention enable a certain format for request and response data packets sent with API calls made by the systems shown in FIG. 2 and FIG. 3. The format utilized for request data packets and response data packets are the same for both scenarios described above, which is convenient.

Figure 4:
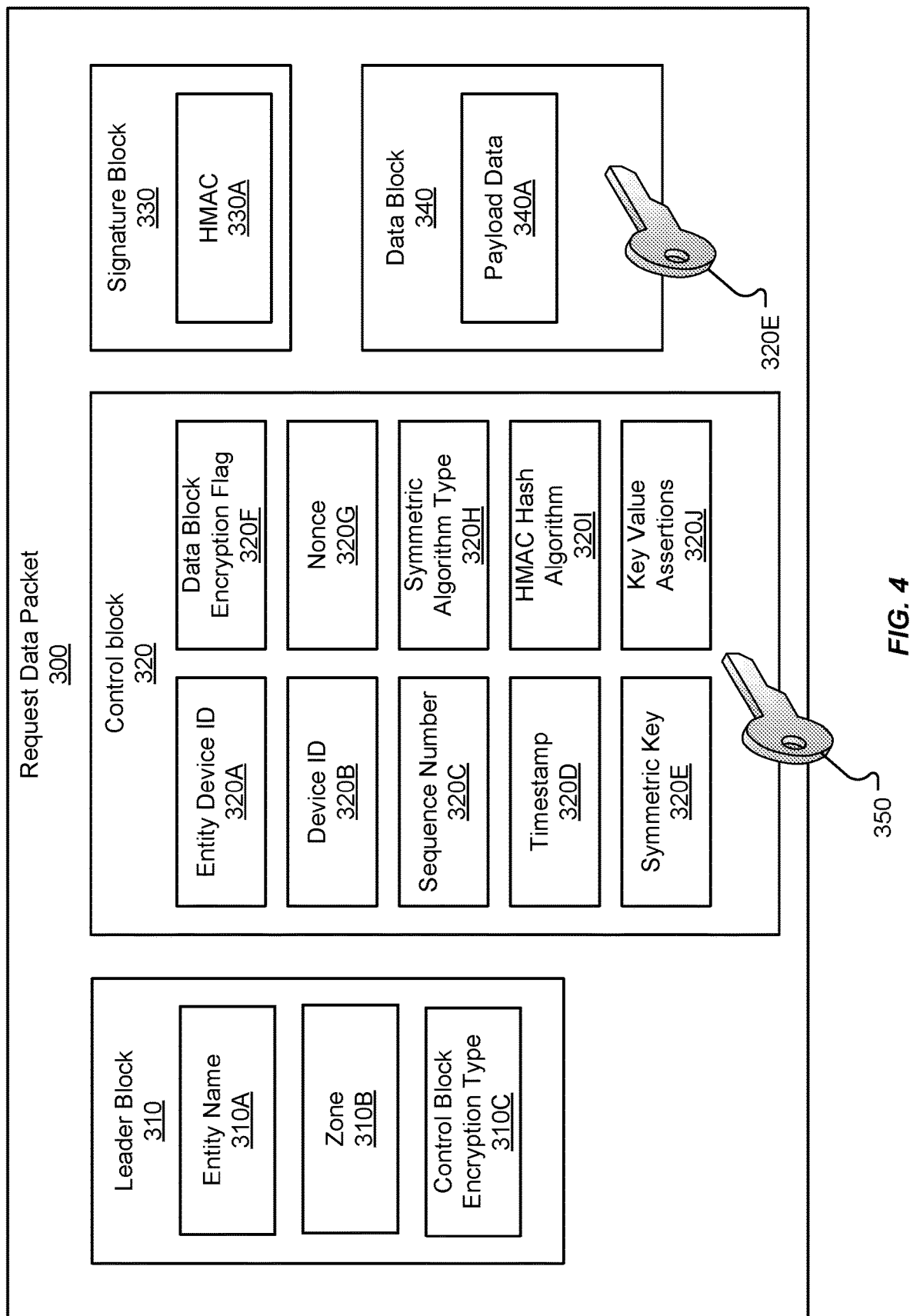
FIG. 4 shows an exemplary data scheme for a request data packet according to some embodiments of the invention.

FIG. 4 shows an exemplary data scheme for a request data packet 300 according to some embodiments of the invention. The request data packet 300 may include a leader block 310, a control block 320, a signature block 330, and a data block 340. The combination of leader block 310, control block 320, signature block 330, and data block 340 may be encoded (e.g., JSON encoded) and sent as the body of an API request sent to a processor server computer. Any reference to a token service or token service system with respect to FIG. 4 may be a reference to the processor server computer associated with the token service.

FIG. 4 show one exemplary data scheme, but embodiments are not so limited. It is understood that the blocks and information within each of the blocks shown in FIG. 3 may be included as part of request data packet 300 in any configuration and the reference labels do not indicate a particular order of data storage. It is also understood that the names of the blocks, as well as information in each block included in request data packet 300 are not limiting. Any suitable names can be utilized, as long as the associated data serves a similar purpose to that described herein.

Leader block 310 may include various metadata of request data packet 300. Leader block 310 may include an entity name 310A, a zone 310B, and a control block encryption type 310C. Leader block 310 may not be encrypted.

Entity name 310A may be a name associated with an entity as enrolled to a token service provider. Some examples include names associated with an authorization entity hosting a mobile application, such as "Authorization entity A" or "Authorization entity B."

Zone 310B may be an operating zone associated a requestor. In some embodiments, the requestor may be an entity associated with an application that makes a API request. Zone 310B may indicate a region (e.g., "North America" zone) from which the requestor is operating. In some embodiments, the value of zone 310B may be selected based on location detection services provided by the mobile device running the application associated with the authorization entity. If the location detection services are disabled on the mobile device, zone 310B may be filled with value associated with a pre-configured default location.

Control block encryption type 310C may be information indicating the certification type for the public-private key pair or the symmetric encryption type utilized to encrypt control block 320. Control block encryption type 310C may also indicate the specific encryption algorithm utilized. Examples of asymmetric encryption algorithms that can be indicated include, but are not limited to, RSA-1024, RSA-2048, and ECC-256. Examples of symmetric encryption algorithms that can be indicated include, but are not limited to, AES-256 and 3DES. Typically, control block encryption type 310C may indicate an asymmetric encryption algorithm.

In some embodiments, control block encryption type 310C may indicate an algorithm for generating a symmetric key. If the API sender and the API receives have a shared secret in common, control block encryption type 310C may indicate that the key utilized for encryption of control block 320 may be computed as Hash(Shared secret||Entity name||Zone). In other embodiments, the key may be generated also based on a variable datum (e.g., salt) to increase randomness such that the key can be computed as, for example, Hash(Shared secret||Entity name||Zone||Salt).

Control block 320 may include various metadata of request data packet 300. Control block 320 may include an entity device ID 320A, a device ID 320B, a sequence number 320C, a timestamp 320D, a symmetric key 320E, a data block encryption flag 320F, a nonce 320G, a symmetric algorithm type 320H, a HMAC hash algorithm 3201, and key value assertions 320J. Control block 320 may be asymmetrically encrypted with encryption key 350. In some embodiments, encryption key 350 may be a public key from a public-private key pair associated with an authorization entity. Encryption key 350 may be issued by the processor server computer providing the token service and provided to the authorization entity indicated by entity name 310A. In some embodiments, any suitable padding scheme (e.g., Optimal Asymmetric Encryption Padding (OAEP) may be added to control block 320 before it is asymmetrically encrypted. Additionally, an optional Base64 encoding can be applied to transform the raw encrypted bytes to Base64 printable data.

Entity device ID 320A may be a reference identifier for the processor server computer providing the token service to ascertain that the application has conducted a proper initial enrollment process with the authorization entity backend server. Entity device ID 320A may be assigned to an application hosted by an authorization entity backend system. In some implementations, entity device ID 320A may be computed as Hash(Entity token service ID||Device ID||Zone), which may be equivalent to which is equivalent to Hash(Hash(Entity ID||Seed)||Device ID||Zone).

Device ID 320B may be an identifier that allows the token service system to validate that the requestor has on-boarded to its parent entity indicated by entity name 310A. The Device ID 320B may be a computed field. For use in a mobile application, device ID 320B may be computed as Hash(Serial #||NEI). For use in a web application, device ID 320B may be computed as Hash(HostName||IP-Address). However, embodiments are not so limited as these are only exemplary computations for device ID 320B. Device ID may also be computed based on other device parameters besides those described above.

Sequence number 320C may be a value unique to the current API invocation and can indicate replay attacks. Sequence number 320C can be a random value that may be generated using a secure random number generator or a pseudo-random number generator.

Timestamp 320D may information indicating the time at which the request data packet 300 was created. Timestamp 320D may show whether the request data packet 300 is expired and thus invalid. The time indicated by timestamp 320D may be a system time in Universal Time Coordinated (UTC) form.

Symmetric key 320E may be a symmetric key that can be utilized to encrypt or decrypt data. Symmetric key 320E may be utilized to symmetrically encrypt data block 340. In some cases, symmetric key 320E may be randomly generated using a secure random number generator, or a pseudo-random number generated value XOR'ed with the lowest 16 bits of the system time (e.g., timestamp 320D). In some cases, symmetric key 320E may be an ephemeral key.

Data block encryption flag 320F may be a value indicating whether to encrypt payload data 340A. The value may be of any suitable data type, such as a Boolean value or a string (e.g., "Yes" or "No"). When data block encryption flag 320F is on (e.g., "True," "Yes," 1, etc.), this can indicate to utilize symmetric encryption to encrypt payload data 340A. When data block encryption flag 320F is off (e.g., "False," "No," 0, etc.), this can indicate to not encrypt payload data 340A for various reasons. For example, payload data 340A may already be encrypted or there may be no confidential information included in payload data 340A worth protecting using encryption methods. This enables encryption of payload data 340A in select circumstances, which saves processing power. It is noted that regardless of the value of data block encryption flag 320F, symmetric key 320E is still generated so that it can be utilized to generate HMAC 330A.

Nonce 320G may be a value that is typically utilized once. In some embodiments, nonce 320G may be a random value generated using a secure random number generator or a pseudo-random number generator.

Symmetric algorithm type 320H may indicate the symmetric encryption algorithm for encrypting data block 340. Some examples of algorithms indicated by symmetric algorithm type 320H include AES-256-CBC and 3DES-CBC.

HMAC hash algorithm 3201 may indicate the hash algorithm utilized for signature calculation. An example of an algorithm indicated by HMAC hash algorithm 3201 includes SHA-2-256. If HMAC hash algorithm 3201 is Null, this may indicate that signature block 330 is not provided in request data packet 300.

Key value assertions 320J may be a key-value list of assertions that the parent entity indicated by entity name 310A is vouching for the application hosted by the authorization entity. Key value assertions 320J may be encrypted by the parent entity in such a way that the processor server computer providing the token service can decrypt it, but the application cannot forge it. For example, in some cases, the key-value assertions list may be encrypted using a key, which may be computed as Hash(Hash(Entity ID||Seed) ||Entity Name||Zone). Since the processor server computer possesses this value, it is able to decrypt the encrypted key-value assertions list. However, the mobile application running on a mobile device is not able to replicate this value because it does not possess Entity token service ID needed as an input to generate the value. An example of a key-value assertion list is {EntityDeviceID=Entity Device ID, PAN=***5972, ExpireTime=098989877678906533}. This assertion states that the device as identified by Entity Device ID has possession of PAN or Token ending in 5972 and the assertion expires at the specified time.

The SMPP validates proper decryption of key value assertions 320J and validates the Entity Device ID stored in key value assertions 320J. As shown in the example above, the key-value assertion list may start with an Entity Device ID set to same value as Entity Device ID 320A in Control Block 320. The SMPP may check whether the Entity Device ID stored in key value assertions 320J matches the value provided in the Entity Device ID 320A of Control Block 320.

Data block 340 may include data of request data packet 300. Data block 340 may include payload data 340A. In some embodiments, data block 340 may be encrypted using symmetric key 320E to protect payload data 340A. Data block 340 may be encrypted using the encryption indicated by symmetric algorithm type 320H. Any suitable initialization vector, padding scheme, or block processing mode may be applied to data block 340 before it is symmetrically encrypted. Additionally, an optional Base64 encoding can be applied to transform the raw encrypted bytes to Base64 printable data.

Payload data 340A may be data that the application requests to send to the processor server computer providing the token service. In some embodiments, payload data 340A may be JSON data. The collection of data to be sent by the application may be encoded into a JSON blob by the API/Application layer. In some embodiments, payload data 340A may include confidential data (e.g., PAN, assertion for PAN, etc.). In this case, data block 340 including payload data 340A may be encrypted using symmetric key 320E to protect the confidential data.

Signature block 330 may include signature data of request data packet 300. Signature block 330 may include HMAC 330A. In some embodiments, signature block 330 may be optional if data block 340 is encrypted. However, it is generally preferable that signature block 330 be included in request data packet 300.

HMAC 330A may be a digital signature for request data packet 300. HMAC 330A may be derived as Hash(Leader block||Control block||Data block) encrypted by an encryption key. The hash algorithm utilized to derive HMAC 330A may be indicated in HMAC hash algorithm 3201 in control block 320. Additionally, the encryption key utilized to derive HMAC 330A may be computed as Hash(Symmetric key-||Nonce), where the symmetric key is symmetric key 320E and the nonce is nonce 320G.

Figure 5:
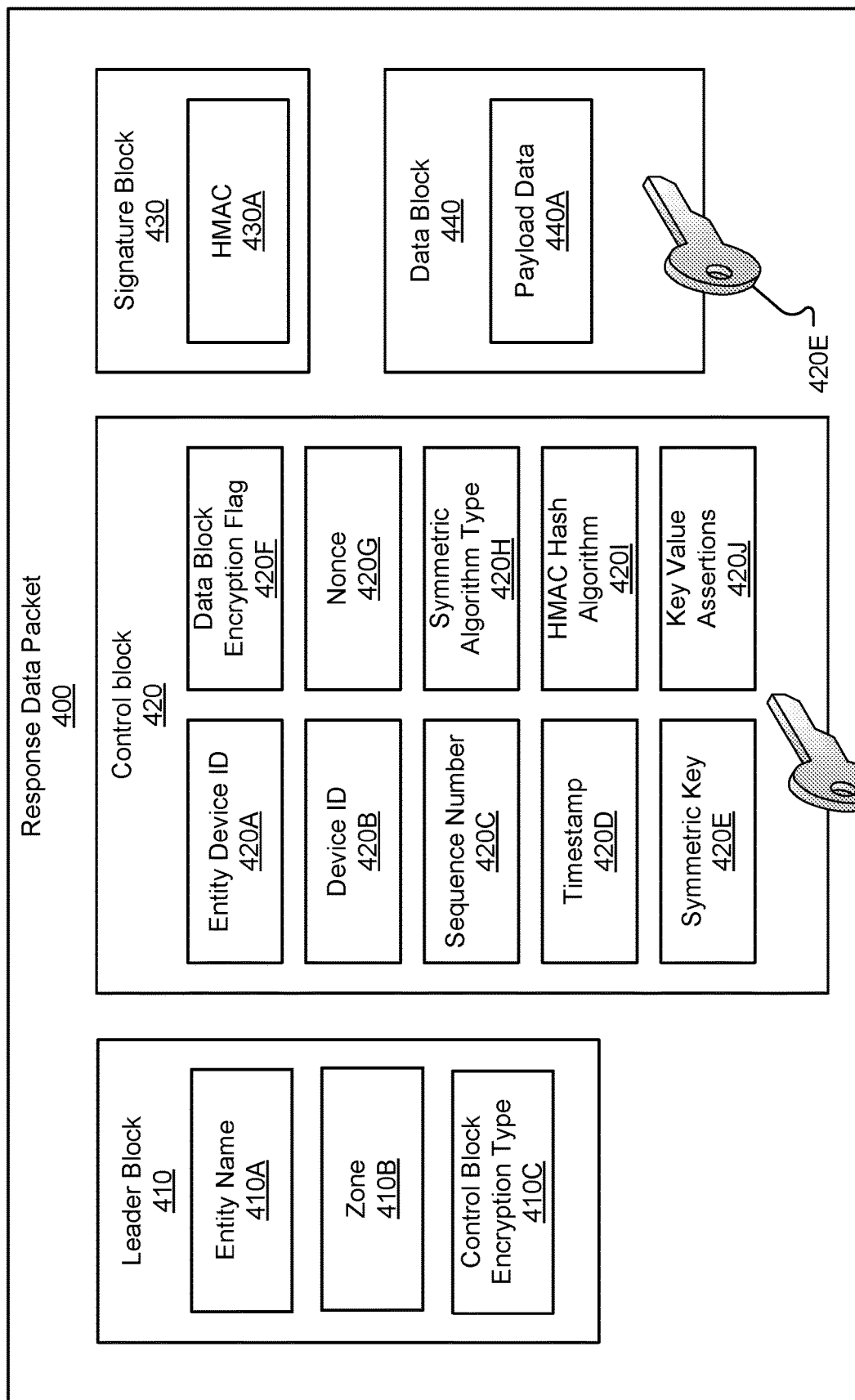
FIG. 5 shows an exemplary data scheme for a response data packet according to some embodiments of the invention.

FIG. 5 shows an exemplary data scheme for a response data packet 400 according to some embodiments of the invention. The response data packet 400 may include a leader block 410, a control block 420, a signature block 430, and a data block 440. The combination of leader block 410, control block 420, signature block 430, and data block 440 may be encoded (e.g., JSON encoded) and sent as the body of an API response sent by a processor server computer. Any reference to a token service or token service system with respect to FIG. 5 may be a reference to the processor server computer associated with the token service.

FIG. 5 show one exemplary data scheme, but embodiments are not so limited. It is understood that the blocks and information within each of the blocks shown in FIG. 5 may be included as part of response data packet 400 in any configuration and the reference labels do not indicate a particular order of data storage. It is also understood that the names of the blocks, as well as information in each block included in response data packet 400 are not limiting. Any suitable names can be utilized, as long as the associated data serves a similar purpose to that described herein.

Leader block 410 may include various metadata of response data packet 400. Leader block 410 may include an entity name 410A, a zone 410B, and a control block encryption type 410C. Leader block 410 may not be encrypted. The values of Entity name 410A and Zone 410B may be echoed back from the Leader Block 310 of request data packet 300 and thus may have similar descriptions to entity name 310A and zone 310B described with respect to FIG. 3.

Control block encryption type 310C may be information indicating the symmetric encryption type utilized to encrypt control block 320. Control block encryption type 310C may also indicate the specific encryption algorithm utilized. Examples of symmetric encryption algorithms that can be indicated include, but are not limited to, AES-256 and 3DES.

Control block 420 may include various metadata of response data packet 400. Control block 420 may include an entity device ID 420A, a device ID 420B, a sequence number 420C, a timestamp 420D, a symmetric key 420E, a data block encryption flag 420F, a nonce 420G, a symmetric algorithm type 420H, a HMAC hash algorithm 4201, and key value assertions 420J. Control block 420 may be symmetrically encrypted with encryption key 450. In some embodiments, encryption key 450 may be a symmetric key associated with an authorization entity. Encryption key 450 may be derived by Hash(Symmetric Key||Entity Name||Zone), where the symmetric key is symmetric key 320E of control block 420. In some embodiments, fields in control block 320 of request data packet 300 (e.g., with the exception of timestamp 420D) may be echoed for response data packet 400. Thus, the data fields for response data packet 400 may have similar descriptions to the corresponding fields described with respect to FIG. 3.

Timestamp 420D may information indicating the time at which the response data packet 400 was created. Timestamp 420D may show whether the response data packet 400 is expired and thus invalid. The time indicated by timestamp 420D may be a system time in Universal Time Coordinated (UTC) form.

Data block 440 may include data of response data packet 400. Data block 440 may include payload data 440A. In some embodiments, data block 440 may be encrypted using symmetric key 420E to protect payload data 440A. Data block 440 may be encrypted using the encryption indicated by symmetric algorithm type 420H. Any suitable initialization vector, padding scheme, or block processing mode may be applied to data block 440 before it is symmetrically encrypted. Additionally, an optional Base64 encoding can be applied to transform the raw encrypted bytes to Base64 printable data.

Payload data 440A may be response from the processor server computer. In some embodiments, payload data 440A may be JSON data. The collection of data to be sent by the processor server computer may be encoded into a JSON blob by the API/Application layer. In some embodiments, payload data 440A may include confidential data (e.g., token associated with PAN, etc.). In this case, data block 440 including payload data 440A may be encrypted using symmetric key 420E to protect the confidential data.

Signature block 430 may include signature data of response data packet 400. Signature block 430 may include HMAC 430A. In some embodiments, signature block 430 may be optional if data block 440 is encrypted. However, it is generally preferable that signature block 430 be included in response data packet 400.

HMAC 430A may be a digital signature for response data packet 400. HMAC 430A may be derived as Hash(Leader block||Control block||Data block) encrypted with an encryption key. The hash algorithm utilized to derive HMAC 430A may be indicated in HMAC hash algorithm 4201 in control block 420. Additionally, the encryption key utilized to derive HMAC 430A may be computed as Hash(Symmetric key||Nonce), where the symmetric key is symmetric key 420E and the nonce is nonce 420G.

A method for securing communications between a first computer (e.g., authorization entity computer) and a second computer (e.g., token service computer) is described with respect to certain components in request data packet 300 of FIG. 4 and response data packet 400 of FIG. 5. In some implementations, several of the steps may be performed in a different order as described or in parallel. Additionally, the computations described in the steps for deriving certain values (e.g., hash values of concatenation of multiple fields) are not limiting. For example, the fields can be concatenated in a different order as that described herein, and other fields can also be utilized in place of those described as well. Further, the names of certain fields utilized in the steps are only for exemplary purposes and thus can be changed to other suitable names.

It is understood that additional methods and processes may be included within these methods and may be recognized by one of ordinary skill in the art, in light of the description below. Further, in some embodiments of the present invention, the described methods may be combined, mixed, and matched, as one of ordinary skill would recognize.

In some embodiments, the first computer may be an authorization entity computer and the second computer may be a token service computer (processor server computer) conducting a transaction that involves transmission of sensitive data. The first computer and the second computer can utilize the SMPP to enable secure communications to protect the sensitive data. The first computer and the second computer may call a token service API enabled by the token service computer.

During the transaction, the first computer may generate a request data packet 300 as shown in FIG. 4, the request data packet 300 comprising leader block 310, control block 320, signature block 330, and data block 340. The first computer may generate the leader block 310. The first computer may include information that it has stored in its systems in leader block 310. For example, the first computer may include entity name 310A, zone 310B, and control block encryption type 310C retrieved from its systems. The leader block 310 is not typically encrypted and may be clear text.

The first computer may also generate the control block 320. The first computer may include various information in control block 320. For example, the first computer may include entity device ID 320A stored during a previous enrollment process as described with respect to FIG. 2 or FIG. 3. The first computer may also include in control block 320 the device ID 420B stored in its systems. The first computer may also include in control block 320 information that it may not have previously stored in its systems and is thus generated by the first computer during creation of request data packet 300. For example, this information may include sequence number 320C to enable a response to be received later to be linked with its associated decryption key, timestamp 320D corresponding to the current system time, symmetric key 320E to be utilized to encrypt data block 340, data block encryption flag 320F to indicate that the data block should be encrypted, nonce 320G to be utilized for encrypting key value assertions 320J, symmetric algorithm type 320H to indicate the algorithm utilizes to encrypt data block 340, HMAC hash algorithm 3201 to indicate the algorithm utilized to generate HMAC 330A, and key value assertions 320J that can be later utilized to validate values in the request data packet 300. The first computer may encrypt control block 320 using encryption key 350, which may be a public key of a public-private key pair issued by the second computer during the previous enrollment process.

The first computer may also generate the data block 340. The first computer may include payload data 340A in data block 340. In some embodiments, the first computer may include sensitive data in payload data 340A, such as a PAN utilized for conducting the transaction. To protect the sensitive data, the first computer may encrypt data block 340 using symmetric key 320E.

The first computer may also generate the signature block 330. The first computer may generate HMAC 330A and include it in signature block 330. The first computer may derive HMAC 330A by first computing the value Hash (Leader block||Control block||Data block) based on leader block 310, control block 320, and data block 340, and then encrypting the computed value using an encryption key. In some embodiments, the encryption key may be derived as Hash(Symmetric key||Nonce), where the symmetric key is symmetric key 320E and the nonce is nonce 320G.

The first computer may send, over a communications network, request data packet 300 to the second computer, which may receive the request data packet 300 in the body of an API call request. The second computer may then decrypt the control block 320 based on information in control block encryption type 310C. In this case, control block encryption type 310C can indicate that the control block 320 is asymmetrically encrypted with any suitable asymmetric algorithm (e.g., RSA-1024, RSA-2048, and ECC-256). Accordingly, the second computer may retrieve a private key corresponding to encryption key 350 of the public-private key pair issued by the second computer during the previous enrollment process. The second computer may then utilize the private key to decrypt control block 320. The second computer may then extract the symmetric key 320E from the control block 320.

The second computer may conduct several verification processes based on information in request data packet 300. For example, the second computer may check timestamp 320D to determine that the API call request is still valid (e.g., not expired). The second computer may also validate proper decryption of key value assertions 320J and may validate the Entity Device ID stored in key value assertions 320J. For example, key value assertions 320J may include a key-value assertion list with value {EntityDeviceID=Entity Device ID, PAN=***5972, ExpireTime=098989877678906533} that is encrypted. In some cases, the key-value assertion list may be encrypted using a key that can be computed as Hash(Hash (Entity ID||Seed)||Entity Name||Zone). Since the second computer has the pieces of information to generate this key (e.g., Entity ID and Seed exchanged during previous enrollment process, and Entity Name and Zone in leader block 310), it can generate the key and decrypt the key-value assertion list. The second computer may check that the Entity Device ID stored in key value assertions 320J matches the value provided in Entity Device ID 320A of control block 320.

The second computer may also verify signature block 330. For example, the second computer may derive the key that can be utilized to decrypt HMAC 330A. In some embodiments, the key can be computed as Hash(Symmetric key||Nonce), where the symmetric key is symmetric key 320E and the nonce is nonce 320G. The second computer may then computer Hash(Leader block||Control block||Data block) based on leader block 310, control block 320, and data block 340 received in request data packet 300 and the hash algorithm indicated in HMAC hash algorithm 320I. The second computer may compare whether the computed value matches the result of decrypting HMAC 330A and if so, determine that HMAC 330A and signature block 330 are valid.

The second computer may then decrypt the encrypted data block 340 with the extracted symmetric key 320E. The second computer may decrypt data block 340 based on the algorithm indicated in symmetric algorithm type 320H. Upon decrypting data block 340, the second computer may access payload data 340A. In some embodiments, the second computer may process payload data 340A to conduct the transaction. For example, the second computer may conduct certain analyses (e.g., fraud analyses) based on payload data 340A. In some cases, the second computer may obtain the PAN from payload data 340A and tokenize the PAN to obtain a token associated with the PAN.

The second computer may then generate a response data packet 400 to return to the first computer. The second computer may include in response data packet 400 the leader block 410 comprising entity name 410A, zone 410B, and control block encryption type 410C. The entity name 410A and zone 410B in leader block 410 may be echoed from those in leader block 310 of request data packet 300. The control block encryption type 410C may include updated information as described in further detail below.

The second computer may also include in response data packet 400 a control block 420 comprising entity device ID 420A, device ID 420B, sequence number 420C, a timestamp 420D, symmetric key 420E, data block encryption flag 420F, nonce 420G, symmetric algorithm type 420H, HMAC hash algorithm 420I, and key value assertions 420J. The values in control block 420 may be echoed from those in control block 320 of request data packet 300, with the exception of timestamp 420D and key value assertions 420J. The second computer may update the timestamp field so that timestamp 420D reflects the current system time, as well as set the key value assertions field, key value assertions 420J, to null.

The second computer may also encrypt control block 420 using encryption key 450. In some cases, the second computer may derive encryption key 450 by computing Hash (Symmetric Key||Entity Name||Zone), where the symmetric key is symmetric key 320E received in request data packet 300. The second computer may include information indicating the symmetric encryption type utilized to encrypt control block 420 in control block encryption type 410C.

The second computer may also include in response data packet 400 a data block 440. The second computer may include payload data 440A in data block 440. In some embodiments, payload data 440A may include some or all of the information received in payload data 340A of request data packet 300. In some embodiments, as described above, the second computer may tokenize a PAN included in payload data 340A to determine a token associated with the PAN, and include the token in payload data 440A. Other additional information may also be included in payload data 440A. Based on data block encryption flag 320F in request data packet 300, which indicates that the data block should be encrypted, the second computer may encrypt data block 440. In some embodiments, the second computer may encrypt data block 440 with encryption key 420E, which may be equivalent to or the same as symmetric key 320E in request data packet 300.

The second computer may also include in response data packet 400 a signature block 430. The second computer may generate HMAC 430A and include it in signature block 430. The first computer may derive HMAC 430A by first computing the value Hash(Leader block||Control block||Data block) and then encrypting the computed value using an encryption key. In some embodiments, the encryption key may be derived as Hash(Symmetric key||Nonce), where the symmetric key is symmetric key 420E and the nonce is nonce 420G.

The second computer may send, over a communications network, response data packet 400 to the first computer, which may receive the response data packet 400 in the body of an API call response. The first computer may then decrypt the control block 420 based on information in control block encryption type 410C. In this case, control block encryption type 410C can indicate that the control block 420 is symmetrically encrypted with any suitable symmetric algorithm (AES-256, 3DES, etc.). Accordingly, the first computer may generate the appropriate symmetric key for decrypting control block 420. In some embodiments, the first computer may derive the key as Hash(Symmetric Key||Entity Name||Zone), where the symmetric key input into the hash is symmetric key 320E of request data packet 300. The first computer may then utilize the derived symmetric key to decrypt control block 420. The second computer may then extract the symmetric key 420E from the control block 420. The symmetric key 420E may be of the same value as symmetric key 320E.

The first computer may conduct several verification processes based on information in request data packet 300. For example, the first computer may check sequence number 420C, which can link request data packet 300 to response data packet 400. In some cases, the first computer may check whether any response has been received for the request associated with sequence number 420C (equivalent to sequence number 320C of request data packet 300). The first computer can decline the response if a valid response has already been received, which can prevent replay attacks. The first computer may also check timestamp 420D to determine that the API call response is still valid (e.g., not expired).

The first computer may also verify signature block 430. For example, the first computer may derive the key that can be utilized to decrypt HMAC 430A. In some embodiments, the key can be computed as Hash(Symmetric key||Nonce), where the symmetric key is symmetric key 420E and the nonce is nonce 420G. The first computer may then compute Hash(Leader block||Control block||Data block) based on leader block 410, control block 420, and data block 440 received in response data packet 400 and the hash algorithm indicated in HMAC hash algorithm 420I. The first computer may compare whether the computed value matches the result of decrypting HMAC 430A and if so, determine that HMAC 430A and signature block 430 is valid.

The first computer may then decrypt the encrypted data block 440 with the extracted symmetric key 420E. The first computer may decrypt data block 440 based on the algorithm indicated in symmetric algorithm type 420H. Upon decrypting data block 440, the first computer may access payload data 440A. In some embodiments, the first computer may utilize payload data 440A to process (e.g., complete) the transaction. For example, the first computer may store in its records the token received from the second computer to utilize for future transactions.

As described above, embodiments of the invention enable secure communication of requests and responses between the first computer and the second computer. The API invocation is secure end-to-end. Further, embodiments of the invention forego the need to store sensitive key information because SMPP enables secure communication of algorithms that can be utilized to generate keys for decryption.

Figure 6:
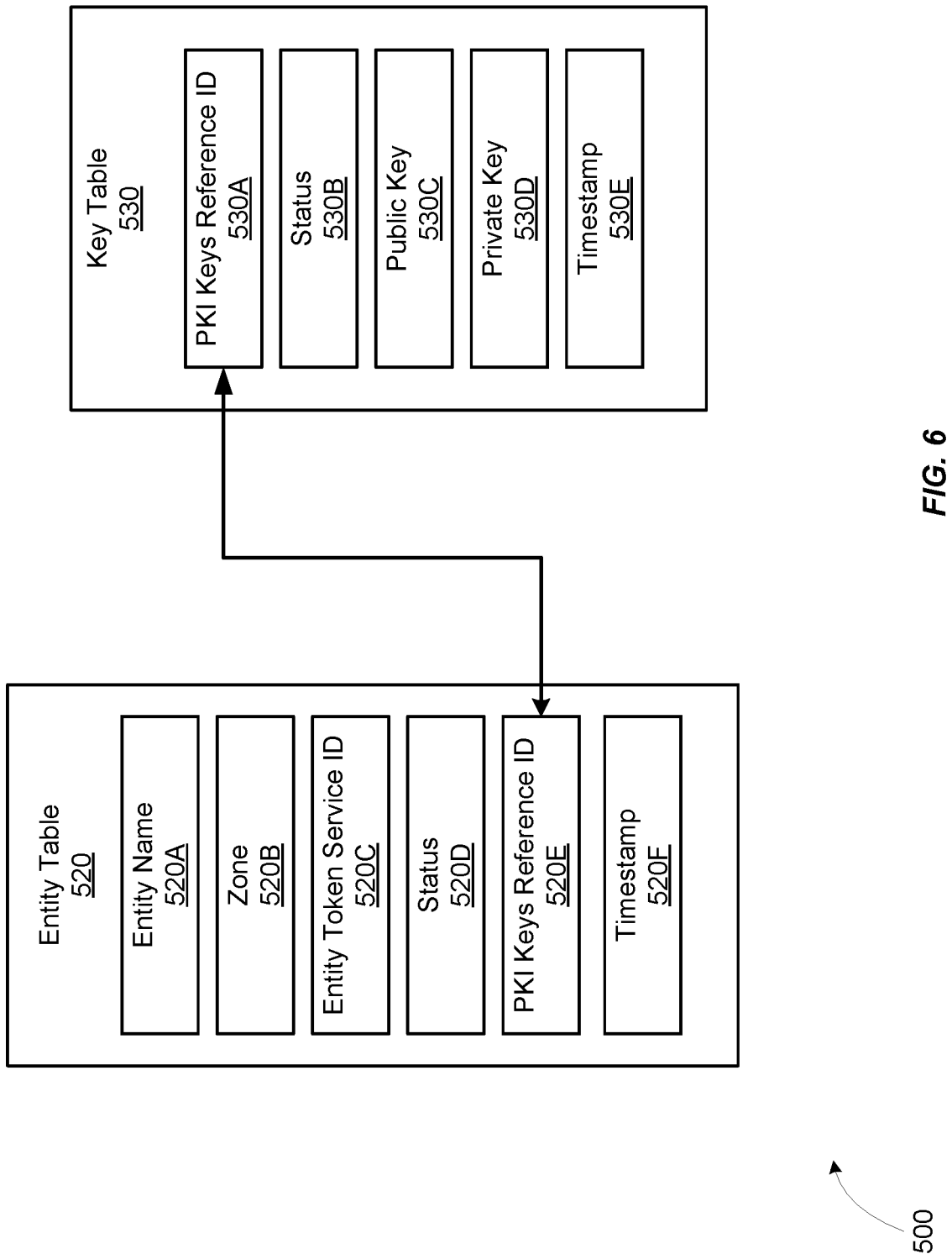
FIG. 6 shows a data scheme for storage of data according to some embodiments of the invention.

FIG. 6 shows a data scheme 500 for storage of data according to some embodiments of the invention. Data scheme 500 includes an entity table 520 and a key table 530 that can be stored by a processor server computer that may provide token services. Entity table 520 and key table 530 may include other fields not explicitly shown in FIG. 6. Further, the reference labels in FIG. 6 are not meant to be indicative of the order in which data is stored, since the data in entity table 520 and key table 530 can be stored in any suitable configuration such that entity table 520 can appropriately reference key table 530 as described below.

A portion of or all information in entity table 520 and key table 530 may be stored in any suitable secure storage provided by the processor server computer. In one embodiment, entity table 520 and key table 530 may both be stored in a HSM environment. However, this configuration is not required. For example, in other embodiments, only an encryption key utilized for encrypting certain data in entity table 520 and key table 530 may be stored in a secure storage, such as a HSM, while entity table 520 and key table 530 may be stored in a database. The latter case is still secure because the pieces of data stored in entity table 520 and key table 530 do not provide enough information on their own to enable decryption and access of potentially sensitive data send in requests and responses.

Entity table 520 may include information associated with a plurality of entities. For simplicity, FIG. 6 shows one record stored in entity table 520 associated with an entity. The record may include an entity name 520A, a zone 520B, an entity token service ID 520C, a status 520D, a PKI keys reference identifier 520E, and a timestamp 520F. Entity name 520A may indicate a name associated with the entity (e.g., "Authorization Entity A") and zone 520B may indicate a location at which the entity operated (e.g., "North America"). In some cases, the entity token service ID 520C may be computed as Hash(Entity ID||seed). Status 520D may indicate validity (e.g., active, revoked, expired, or pending) of information stored in the record. The PKI keys reference identifier 520E may be an identifier that may reference information in key table 530. In some embodiments, PKI keys reference identifier 520E may also be known as the entity device ID. Timestamp 520F may indicate a timestamp (e.g., at which the record was generated) and may be utilized to determine status 520D. In some embodiments, entity token service ID 520C may be encrypted while at rest.

Key table 530 may include information associated with a plurality of keys associated with entities. For simplicity, FIG. 6 shows one record stored in entity table 520 associated with an entity. The record may include a PKI keys reference identifier 530A, a status 530B, a public key 530C, a private key 530D, and a timestamp 530E. The PKI keys reference identifier 530A may be an identifier that can reference key information associated with an entity. In some embodiments, PKI keys reference identifier 530A may also be known as the entity device ID. Status 530B may indicate validity (e.g., active, revoked, expired, or pending) of information (e.g., public key 530C and private key 530D) stored in the record.

Public key 530C and private key 530D can make a public-private key pair issued to the entity associated with PKI keys reference identifier 530A by the processor server computer. Timestamp 530E may indicate a timestamp (e.g., at which the record was generated) and may be utilized to determine status 530B. In some embodiments, public key 530C and private key 530D may be encrypted while at rest.

In a typical flow, upon receiving an API request from an entity (e.g., authorization entity), the processor server computer may access information in entity table 520 or key table 530 to utilize for generating a API response. The processor server computer can first obtain at least an entity name and a zone included in a received API request. Based on the received entity name and the zone, the processor server computer can identify the record in entity table 520 that includes an entity name and zone of the same value. In this case, the record may be the one that includes entity name 520A and zone 520B. The processor server computer can then look up the corresponding entity token service ID 520C in the record and utilize it to compute Hash(entity token service ID||device ID), which is expected to be equivalent to the entity device ID included in the API request. Processor server computer may then compare the entity device ID received in the API request against its computed value for validation. If a match is found, processor server computer may access key table 530 and look for PKI keys reference identifier 530A, which corresponds to PKI Keys reference identifier 520E of entity table 520. The processor server computer can then access a public key 530C and private key 530D associated with the entity that sent the API request and utilize any accessed information for generation of an API response.

There are several cases in which an API request may fail based on information in entity table 520 and key table 530. For example, if the processor server computer does not find a match between the entity device ID received in the API request and the entity device ID that it computed, the API request may fail. Additionally, upon accessing a record in entity table 520, the processor server computer may check status 520D to determine whether the information stored in the record is still valid. In some cases, processor server computer may determine that status 520D indicates that the information in the record is revoked or expired, causing the API request to fail. Similarly, upon accessing a record in key table 530, the processor server computer may check status 530B to determine whether the information stored in the record is still valid. In some cases, processor server computer may determine that status 530B may indicate that the information in the record (e.g., public key 530C and private key 530D) is revoked or expired, causing the API request to fail.

In conclusion, embodiments of the invention enable secure communication of requests and responses to and from the processor server computer providing a token service. The token service API invocation is secure end-to-end (e.g., application to the processor server computer) irrespective of how many interim hops the request or response data travel through while in-transit. Several strengths of the Secure Multi Party Protocol (SMPP) are highlighted below.

First, the strength of the cryptographic algorithm protocol does not depend on obscuring the details of the algorithm. The specifications for SMPP scheme can be shared with the public and still be secure. The SMPP is made from a set of basic crypto primitives for symmetric and asymmetric encryption, and hashing. For example, SHA-2-256 as a crypto building block is cryptographically secure against brute force pre-image and collision attack. AES-256 CBC mode, or even 3DES CBC mode, as a crypto building block is also secure against brute force attack. RSA-2048 as a crypto building block is also cryptographically secure against brute force attack. Same for ECC-256. The crypto building blocks of SMPP protocol are therefore all cryptographically secure. The arrangement of steps in the algorithm, and any key generation steps, are thus the only subjects of this cryptanalysis.

Additionally, the processor server computer generated public key for the Authorization Entity and Zone combination, as stored on the application is public data and requires no special data handling in the authorization entity mobile/Web application. The Entity Device ID is securely pushed by the application backend to the application during the mobile application enrollment process to the application backend, and the web app initialization process to the application backend. The pushed data can be protected by SSL/TLS at the channel level, and encrypted with a negotiated key. Therefore Entity Device ID has both data and channel security while in transit.

Entity Device ID as pushed to the mobile/Web application by the authorization entity backend is also device specific, which increases security. That is, each enrolled mobile device, or Web application instance gets its own unique value as an Entity Device ID. Upon receipt of this device specific Entity Device ID, it is securely stored by the mobile application (e.g., in the key chain), and is protected by the mobile OS security while at rest. In the Web application scenario, it is stored in-memory only in an application server running in a secure production environment. Regardless, this device specific Entity Device ID is a reference identifier utilized by the processor server computer to ascertain that the application has been properly enrolled to the authorization entity backend system and is not sensitive key information. Thus, compromise of a device specific Entity Device ID at most only compromises one device. Therefore, the reward to seek compromise of a non-key, device specific ID compared to the level effort required to do so, is very little. Therefore, secure storage of Entity Device ID in the device keychain, or in app-server memory in secure production environment, provides proper security controls for this data item.

For performance reasons, if the API JSON Data is already encrypted by the API Layer of SMPP, then it can be configured in the Control Block to not to re-encrypt this data object when inserting it in Data block. Similarly, for performance reasons, if the SMPP Data Block is encrypted, the API requestor can state via a value in Control Block that no Signature Block should be created. Therefore, SMPP can provide end-to-end confidentiality in these cases, and not integrity. The two performance optimizations above, along with ability to include other JSON data items outside the SMPP JSON blob are provided to enable SMPP to be applied to a wide variety of API use-cases.

Further, the SMPP enables strong protection of encrypted data. The Symmetric Key for the Data and Signature block encryption can be randomly generated for each use, and may be stored encrypted in the Control Block. Thus, to obtain it, one must either obtain the Private Key associated with the Public Key used for asymmetric Control Block encryption (in secure possession of the processor server computer only), or break the asymmetric PKI scheme through brute force.

The KeyValueAssertions list provides yet another way of validating authorization entity to Mobile/Web Application device interaction by the processor server computer. In short, the application backend can state a set of assertions, such as possession of a PAN/Token by the device, and the processor server computer can cryptographically validate that these assertions came from the application backend and are bound to the application making the API request to the processor server computer. This provides additional security.

To increase the randomness of the symmetric key generated for the Data Block encryption, the symmetric key can be derived as composition of a random number and system time. This increases the overall quality of the random data due to additional small entropy available in low-resolution bits of time (e.g., micro-seconds resolution). Not all random numbers on a mobile device may have sufficient entropy by themselves, especially if a pseudo random number generator (PRNG) is used instead of a secure random number generator (SRNG). Therefore, some bit-level correlation may exist across random values. Combining (e.g., computing XOR) a given random number with low bits of system time can increase the overall amount of entropy by removing any bit-level correlation.

While the entropy on the mobile device may be limited for generating good quality random numbers if a SRNG is not available in the programming environment of the application, the benefit is that any data randomly generated (e.g., Nonce, symmetric key, etc.) is always strongly encrypted while stored in the Control Block of request data packet or response data packet. Therefore, it is not possible to get to it, and therefore the overall quality of the random number generation is of less concern.

All interim values sent in a request data packet are deleted except for the symmetric key and sequence number in the control block to be utilized for decryption of the response packet data. While waiting for the response, the application may store the symmetric key in memory (e.g., cache) as the symmetric key encrypted using a key value computed by the result of Entity Device ID XOR'd with the sequence number. Therefore, knowledge of Entity Device ID is required before the symmetric key can be deciphered and used. This configuration provides security because the Entity Device ID is not known by or shared with any intermediary entity (e.g., service provider) between the application and the processor server computer. As was mentioned earlier, this Entity Device ID is device specific and is pushed by the application backend to the application during the first initialization of the application.

Finally, all keys for request/response processing are generated randomly when needed, and are not stored anywhere after processing of the request and the response is complete. Thus, this reduces the risk that sensitive key information is stolen.

Some other considerations for implementing embodiments of the invention are included below. It is recommended that an SDK for Java and C/C++ programming environment for Android based Mobile devices be distributed. Similarly, it is recommended that that the payment processing network/token service develop a server side Java library for Linux and Windows Web Application development on the backend. The mobile SDK may be packaged with other SDKs, if appropriate. For instance, it can be packaged with an SDK for authorization entities on an Android mobile device. The mobile SDK can also be bundled with third party run-time protection guards.

The Mobile SDK, or the server side Web application SDK can support two API calls including one for encoding and another for decoding. These two API calls can significantly simplify application development for the API invocation, because they handle all the semantics of asymmetric and symmetric encoding of data as described in SMPP above. The application may want to send information (e.g., Entity Name, Zone, Entity ID, Device ID, processor server computer generated authorization entity Public Key, its certificate type (e.g., RSA-2048), SequenceNo, and other data) from the application to the processor server computer as a JSON encoded data blob.

The API function for encoding can produce and return a JSON data blob containing the four blocks (Leader, Control, Data, and Signature blocks) of request data packet or response data packet. The API function for encoding can internally cache the symmetric key utilized for encoding of the data block. In some cases, this symmetric key may be protected. For example, a different value may be computed using the symmetric key as one input (e.g., the symmetric key may be XOR'ed with the Entity ID OR'ed with SequenceNo) and stored in the cache while awaiting a response from receiver.

The API function for decoding can take a blob of JSON data returned from the processor server computer to the application in addition to the Entity ID and SequenceNo, and produce the "internal" JSON response data. The returned data can be a JSON data object. The API function for decoding may derive the symmetric key from the value stored in the cache. For example, the symmetric key may be derived by taking the Entity ID OR'ed with SequenceNo and taking the result XOR'ed with the value stored in the cache.

The cache may be secure. For example, any data sitting in the SMPP SDK cache is secure because every cache item is individually encrypted with a key that is not known to the SDK (e.g., "Entity Device ID OR'd with SequenceNo"), and is provided to it from the caller. Any intermediate data used by the cache layer, along with any key data that is finished being used, can immediately be zeroed out and deleted from cache layer. The cache may be a key-value object. SequenceNo may serve as the correlation ID for matching a response with its associated decryption key as stored in the cache.

In accordance with at least some embodiments, the system, apparatus, methods, processes and/or operations for event processing may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, various aspects of elements that may be present in a computer device and/or system configured to implement a method and/or process in accordance with some embodiments of the present invention. The subsystems can be interconnected via a system bus. Additional subsystems such as a printer, a keyboard, a fixed disk, and a monitor, which is coupled to a display adapter, and others are shown. Peripherals and input/output (I/O) devices, which couple to an I/O controller, can be connected to the computer system by any number of means known in the art, such as a serial port. For example, the serial port or an external interface can be utilized to connect the computer device to further devices and/or systems including a wide area network such as the Internet, a mouse input device, and/or a scanner. The interconnection via the system bus allows one or more processors to communicate with each subsystem and to control the execution of instructions that may be stored in a system memory and/or the fixed disk, as well as the exchange of information between subsystems. The system memory and/or the fixed disk may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for securing communications between a first computer and a second computer, the method comprising:
   securing a communication connection over a communications network at least in part by:
   encrypting, by the first computer, a first data block with a cryptographic key;
   generating, by the first computer, an encrypted first control block by encrypting a first control block;
   generating, by the first computer, a request data packet of the communication connection, the request data packet including the encrypted first control block and the encrypted first data block;
   sending, by the first computer, the request data packet to the second computer over the communications network, wherein the second computer generates a response data packet comprising an encrypted second control block and an encrypted second data block;
   receiving, by the first computer, the response data packet of the communication connection from the second computer over the communications network;
   generating, by the first computer, a second symmetric key using a predetermined algorithm;
   decrypting, by the first computer, the encrypted second control block with the generated second symmetric key to obtain a second control block; and decrypting, by the first computer, the encrypted second data block with a cryptographic key that is determined using data in the second control block to obtain a second data block.

2. The method of claim 1, wherein the cryptographic key used to encrypt the first data block and the cryptographic key used to encrypt the second data block are each a first symmetric key, which is an ephemeral key.

3. The method of claim 2, wherein the first symmetric key is generated using a shared secret and a variable datum previously supplied by the second computer.

4. The method of claim 3, wherein the variable datum is a salt.

5. The method of claim 1, wherein the encrypted second data block is formed by encrypting the second data block with a first symmetric key, and the second symmetric key is different from the first symmetric key.

6. The method of claim 1, wherein data utilized to generate the second symmetric key is in a leader block in the response data packet.

7. The method of claim 1 wherein the first computer is an authorization entity computer and the second computer is a token service computer.

8. The method of claim 1, wherein the request data packet further comprises a first leader block and a first signature block, and the response data packet further comprises a second leader block and a second signature block.

9. The method of claim 8, wherein the first leader block includes information indicating an encryption algorithm utilized to obtain a key for decrypting the encrypted first control block, and wherein the second leader block includes information indicating an encryption algorithm utilized to obtain a key for decrypting the encrypted second control block.

10. A first computer comprising:
a processor; and
a computer readable medium coupled with the processor, the computer readable medium comprising code executable to perform a method comprising:
securing a communication connection over a communications network at least in part by:
encrypting a first data block with a cryptographic key;
generating an encrypted first control block by encrypting a first control block;
generating a request data packet of the communication connection, the request data packet including the encrypted first control block and the encrypted first data block;
sending the request data packet to a second computer over the communications network, wherein the second computer generates a response data packet comprising an encrypted second control block and an encrypted second data block;
receiving, the response data packet of the communication connection from the second computer over the communications network;

generating a second symmetric key using a predetermined algorithm;
decrypting the encrypted second control block with the generated second symmetric key to obtain a second control block; and
decrypting the encrypted second data block with a cryptographic key that is determined using data in the second control block to obtain a second data block.

11. The first computer of claim 10, wherein the encrypted first control block further comprises a timestamp.

12. The first computer of claim 10, wherein the first data block comprises a token.

13. The first computer of claim 12, wherein the first control block comprises a sequence number.

14. The first computer of claim 10, wherein the first control block comprises a device ID and sequence number.

15. A method for securing communications between a first computer and a second computer, the method comprising:
receiving, by the second computer from the first computer over a communications network, a request data packet, the request data packet including an encrypted first control block, and an encrypted first data block;
decrypting, by the second computer, the encrypted first control block with a cryptographic key to obtain a first control block;
decrypting, by the second computer, the encrypted first data block with a first symmetric key to obtain a first data block, the first symmetric key based on data in the first control block;
generating, by the second computer, a second symmetric key using a predetermined algorithm based on data in the first control block;
generating, by the second computer, a response data packet, the response data packet comprising an encrypted second data block and an encrypted second control block, the encrypted second control block formed by encrypting a second control block with the second symmetric key; and
transmitting, by the second computer, the response data packet to the first computer over the communications network.

16. The method of claim 15, wherein the first symmetric key is an ephemeral key.

17. The method of claim 15, wherein the first symmetric key is generated using a shared secret and a variable datum previously supposed by the second computer.

18. The method of claim 17, wherein the variable datum is a salt.

19. The method of claim 15, wherein the first data block comprises a token.

20. The method of claim 15, wherein the first computer and the second computer interact via an API.

* * * * *